No. 740,511. PATENTED OCT. 6, 1903.
J. H. ASBURY.
BOOK FOR ADVERTISING.
APPLICATION FILED JUNE 8, 1903.
NO MODEL. 3 SHEETS—SHEET 1.

Witnesses
E. F. Stewart
Daxter Norton

John H. Asbury, Inventor.
by C. A. Snow & Co.
Attorneys

No. 740,511. PATENTED OCT. 6, 1903.
J. H. ASBURY.
BOOK FOR ADVERTISING.
APPLICATION FILED JUNE 9, 1903.
NO MODEL. 3 SHEETS—SHEET 2.

No. 740,511. PATENTED OCT. 6, 1903.
J. H. ASBURY.
BOOK FOR ADVERTISING.
APPLICATION FILED JUNE 9, 1903.

NO MODEL. 3 SHEETS—SHEET 3.

Witnesses John H. Asbury, Proprietor.
by
Attorneys

No. 740,511.                                                  Patented October 6, 1903.

UNITED STATES PATENT OFFICE.

JOHN H. ASBURY, OF LEXINGTON, OKLAHOMA TERRITORY.

BOOK FOR ADVERTISING.

SPECIFICATION forming part of Letters Patent No. 740,511, dated October 6, 1903.

Application filed June 9, 1903. Serial No. 160,782. (No model.)

*To all whom it may concern:*

Be it known that I, JOHN H. ASBURY, a citizen of the United States, residing at Lexington, in the county of Cleveland and Territory of Oklahoma, have invented a new and useful Book for Advertising, of which the following is a specification.

This invention relates to books for advertising purposes; and it consists in the construction and arrangement of parts of a book hereinafter described and claimed, and illustrated in the accompanying drawings, forming a part of this specification, to which reference will be had in explaining the nature and objects of the invention.

Advertising has within recent years become a matter of such extreme importance in connection with all forms of business that the preparation of advertising matter of readable character, the devising of spectacular appliances for displaying advertising matter, and the effective arrangement in publications of various sorts of all kinds of advertisements have become matters of such importance that much time and thought have been bestowed thereon.

The object of this invention is to provide a book for advertising purposes containing in connection with the advertisements displayed therein a quantity of useful information of such character that frequent reference will be had thereto, the information and the advertising matter being so intermingled throughout the book that frequent reference to the book for information will of necessity bring before the eyes of the reader the advertisements displayed therein.

Figure 1:
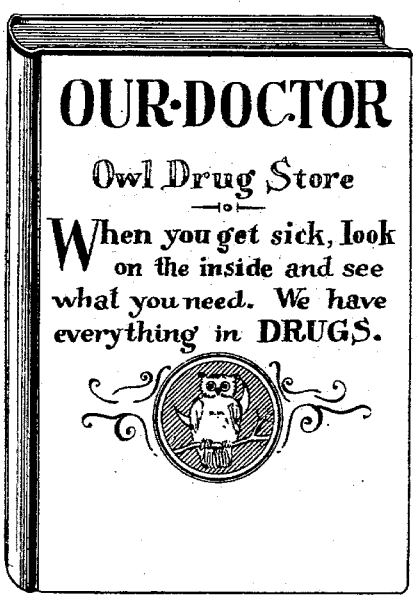
Figure 5:
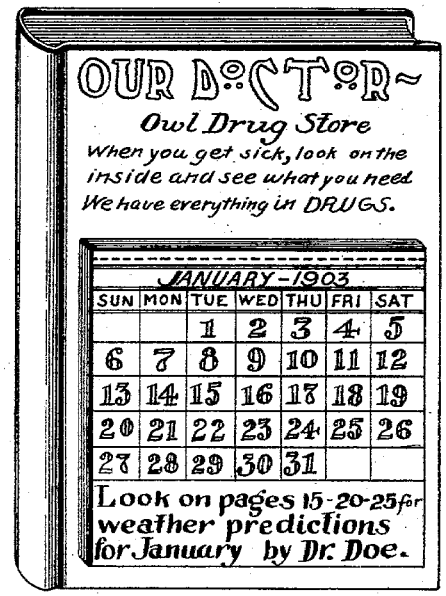
Figure 2:
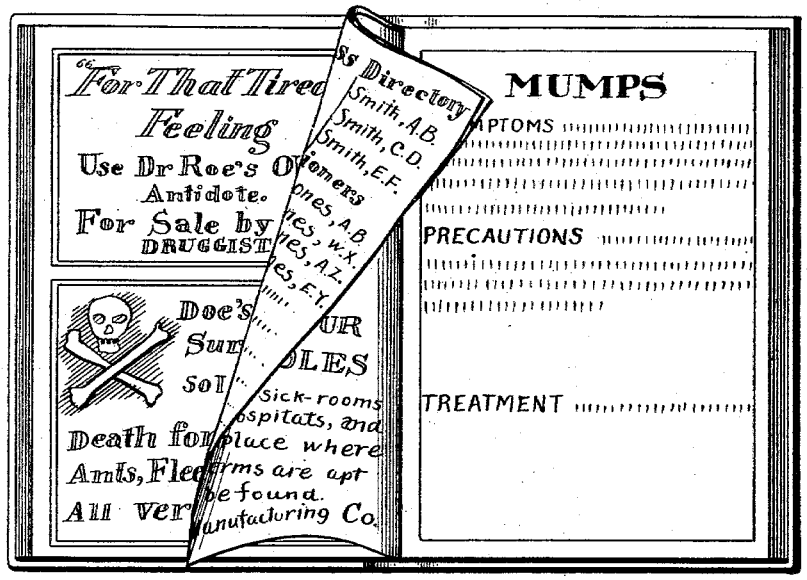
Figure 3:
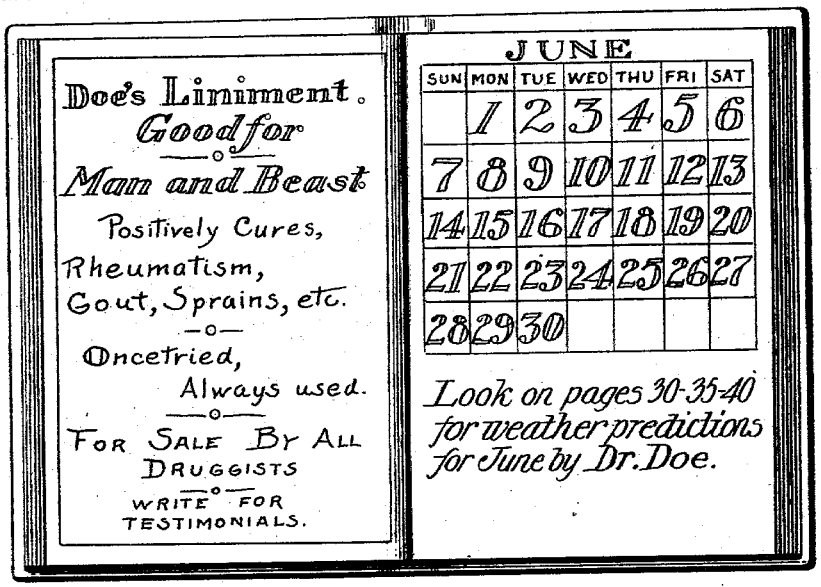
Figure 4:
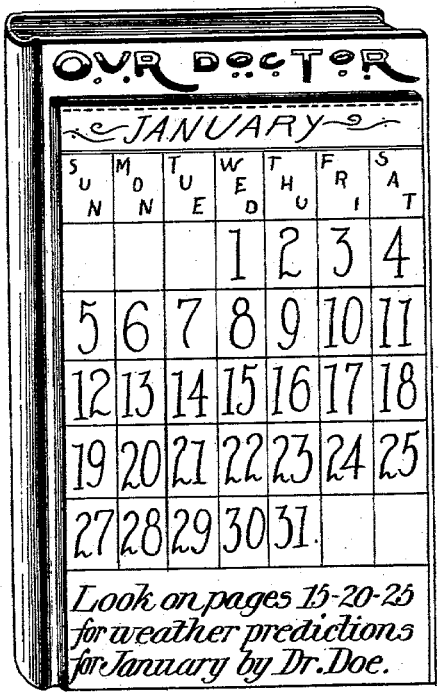
Figure 6:
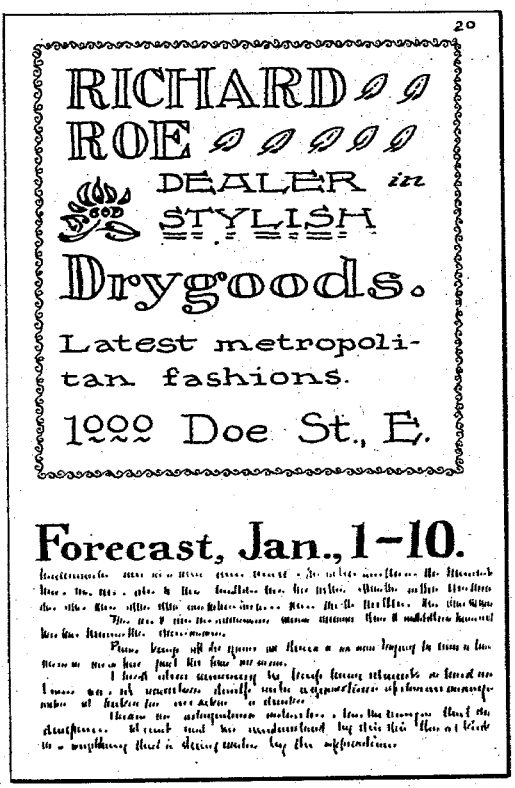
Figure 7:

In the drawings, Figure 1 is a view in perspective of a preferred form of the book closed. Fig. 2 is a view in perspective of the book shown in Fig. 1 open to show the general arrangement of advertising matter and matters of interest. Fig. 3 is a view of the book open to show one of the calendar-pages bearing references to succeeding faces for weather forecasts. Fig. 4 is a view in perspective of one modified form of embodiment of the invention. Fig. 5 is a view in perspective of another modified form of the embodiment of the invention. Fig. 6 is a view of a page showing the forecast for the first period of the month of January. Fig. 7 is a view of a page showing the forecast for the second period of January.

The book by means of which the object above stated is obtained is designed primarily for use by druggists, and hence much of the information presented therein relates more or less closely to the articles sold by druggists. When the book is to be used in connection with other forms of business, the contents will be appropriately changed.

The book is provided with a cover upon the front page of which appears the title, the preferred title for the book selected as an illustration of the invention being "Our Doctor" or some other equivalent title, and in connection therewith will appear a suitable cover designed of attractive character in which is embodied some advertising feature. Upon the inside of the front leaf of the cover advertisements will be displayed, and upon the outside of the last leaf of the cover advertisements will preferably be also displayed. At the beginning of the book proper I prefer to place a suitable introduction setting forth the character of the information contained in the book and the value of the information to persons of various occupations. Following the introduction there will preferably be a business directory of the town in which the business establishments advertised in the book are located. Following the business directory will come an index of the information portion of the book and of the advertisements contained therein. The introduction, the business directory, and the index will appear only upon alternate pages, and the pages intervening will be used for the display of advertisements. Immediately after the parts of the book above mentioned, with the advertising matter interspersed therewith, will be placed the calendar for the month of January, and at the bottom of the page bearing the calendar will be a reference to a plurality of subsequent pages for weather forecasts for different periods of the month. These weather forecasts will preferably be made for periods of about ten days each, as from the first to the tenth of the month, inclusive, from the eleventh to the twentieth, inclusive, and from the twenty-first to the last day of the month, inclusive, and the forecast for each one of these periods will appear upon a separate page. The pages bearing the several forecasts for the successive periods above mentioned will not be placed together, but will be separated by pages bearing other matter—as, for example, if the calendar be displayed upon page 10 the forecast for the first ten days of the month may appear upon page 15, the forecast for the next ten days may appear upon page 20, and the forecast for the last period of the month may appear upon page 25. Following this plan the calendar for the month of February would appear upon page 30 and the forecast for the first ten days of February would appear upon page 35, the same arrangement being continued throughout the remainder of the book. Upon pages intervening between those mentioned will be presented articles upon various diseases, setting forth briefly the best marked symptoms of the disease by which they may be recognized, the modes of preventing the disease, and the proper treatment therefor, and the pages bearing these brief articles upon diseases and those bearing the calendar and the weather forecasts will alternate with pages bearing advertising matter.

In addition to the alternate arrangement of the pages bearing advertising matter and the pages bearing useful information the same general plan of the book may be followed out by the insertion upon the pages devoted primarily to information for ready reference of small advertisements between the paragraphs containing information.

While in the plan of book above outlined the arrangement of the calendar and the forecasts is such as to make a book of convenient size, it is obvious that the arrangement may be varied by bringing the pages of the calendar and weather forecasts closer together or by separating them more, according to the amount of advertising matter to be displayed in the book.

As the information presented in the book is of a character to interest a large proportion of the population of any locality, the book will necessarily be referred to very frequently throughout the year, and the advertisements displayed therein will consequently be brought to the attention of persons having the book, thus making the book a means of very effective advertising, because the advertisements contained therein will be frequently brought to the attention of users of the book, and because the book being of such character that it will be preserved throughout the entire year and kept for ready reference during all of that period the advertisements contained therein will be repeatedly brought to view.

In the modified form of the invention shown in Fig. 4 the pages comprising the calendar are placed upon the front of the cover of the book and are adapted for removal one by one as the periods covered by the successive pages elapse. Each of the calendar-pages in this modified form of the invention is, however, provided at the bottom thereof with references to pages arranged at intervals within the book upon which are printed forecasts of the weather for portions of the period covered by the calendar-page upon which said references appear.

In the modified form of the invention shown in Fig. 5 the calendar is printed upon half-pages, which are secured on the lower part of the front surface of the cover and may be detached as the successive periods covered by the calendar-pages elapse. The half-pages bearing the calendar in this form of the invention are also provided with references to pages within the book for the weather forecasts for separate portions of the period covered by the calendar-page upon which the references appear.

Having thus described the nature and object of my invention, what I claim as new, and desire to secure by Letters Patent, is—

A book for advertising purposes comprising a plurality of pages disposed at intervals throughout the book and forming a calendar for a year, each of said pages forming the calendar bearing references to subsequent pages separately placed throughout the book for weather forecasts for the year, a plurality of pages bearing weather forecasts arranged at intervals throughout the book, pages arranged between the calendar and forecast pages and bearing brief discussions of common diseases, their causes, symptoms, prevention, and treatment, and a number of advertising-pages approximately equaling the total number of other pages in the book arranged alternately with the other pages in the book, all substantially as described and for the purposes specified.

In testimony that I claim the foregoing as my own I have hereto affixed my signature in the presence of two witnesses.

JOHN H. ASBURY.

Witnesses:
J. ROSS COLHOUN,
J. H. JOCHUM, Jr.